(12) United States Patent
Seo

(10) Patent No.: US 12,494,094 B2
(45) Date of Patent: Dec. 9, 2025

(54) SYSTEM AND METHOD FOR CONTROLLING VEHICLE

(71) Applicants: Hyundai Motor Company, Seoul (KR); Kia Corporation, Seoul (KR)

(72) Inventor: Jae Am Seo, Seongnam-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 129 days.

(21) Appl. No.: 18/610,714

(22) Filed: Mar. 20, 2024

(65) Prior Publication Data

US 2025/0104485 A1    Mar. 27, 2025

(30) Foreign Application Priority Data

Sep. 25, 2023 (KR) .................. 10-2023-0128420

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01); *G07C 5/0816* (2013.01)

(58) Field of Classification Search
CPC .... G07C 5/008; G07C 5/0808; G07C 5/0816; H04L 12/40039; H04L 1/20; H04L 12/40013; H04L 2012/40215; H04L 2012/40273; B60R 16/0232
USPC ...................................................... 701/31.4
See application file for complete search history.

(56) References Cited

U.S. PATENT DOCUMENTS

| | | | |
|---|---|---|---|
| 10,608,447 B2 * | 3/2020 | Varughese | ............ B60R 16/033 |
| 2021/0184890 A1 * | 6/2021 | Kim | ........................ G07C 5/008 |

FOREIGN PATENT DOCUMENTS

| | | | |
|---|---|---|---|
| CN | 113923137 A | | 1/2022 |
| CN | 114684046 | * | 7/2022 |
| CN | 114684046 A | | 7/2022 |
| CN | 115016429 | * | 9/2022 |
| CN | 115016429 A | | 9/2022 |
| KR | 20100039638 | * | 4/2010 |
| KR | 20100039638 A | | 4/2010 |
| KR | 20180056620 | * | 5/2018 |
| KR | 20180056620 A | | 5/2018 |
| KR | 20210077542 | * | 6/2021 |
| KR | 20210077542 A | | 6/2021 |

* cited by examiner

*Primary Examiner* — Muhammad Shafi
(74) *Attorney, Agent, or Firm* — Slater Matsil, LLP

(57) ABSTRACT

An embodiment system for controlling a vehicle includes at least one controller configured to generate error information based on a number of times a transmission error is detected after transmitting a first message after waking up and store the error information at a time point at which the first message is successfully transmitted, a managing controller configured to receive the error information from the at least one controller, in response to the first message being successfully transmitted, and determine a first wake-up controller based on the received error information, and a server configured to receive information about the first wake-up controller from the managing controller, predict an operation of the vehicle based on the information about the first wake-up controller, and generate prediction information.

16 Claims, 13 Drawing Sheets

SYSTEM AND METHOD FOR CONTROLLING VEHICLE

CROSS-REFERENCE TO RELATED APPLICATIONS

This application claims the benefit of Korean Patent Application No. 10-2023-0128420, filed on Sep. 25, 2023, which application is hereby incorporated herein by reference.

TECHNICAL FIELD

The present disclosure relates to a system and a method for controlling a vehicle.

BACKGROUND

Recently, as an electronic control technology of a vehicle is developed, various types of controllers have been mounted inside the vehicle to calculate the optimal control value using an electrical signal received from various types of sensors and to optimize the overall operation of the vehicle in addition to vehicle driving, based on the calculated optical control value.

As described above, controllers mounted in the vehicle are connected to each other through a CAN bus to make CAN communication and have a function of waking up in a remote place. Accordingly, when one controller wakes up, remaining controllers wake up.

Accordingly, if a specific controller erroneously operates, or wakes up in an unplanned situation, the remaining controllers are frequently shifted to a wake-up state or do not sleep, causing a battery to be discharged intermittently.

Accordingly, even though a controller (hereinafter, a wake-up inducing controller) inducing the remaining controllers to wake up should be identified, since the remaining controllers are in a sleep state at a time point at which the specific controller wakes up, the remaining controllers fail to identify the controller which induces the remaining controllers to wake up. Accordingly, it is difficult to identify the wake-up inducing controller.

SUMMARY

The present disclosure relates to a system and a method for controlling a vehicle. Particular embodiments relate to a system and a method for controlling a vehicle capable of making unified diagnostic service communication.

Embodiments of he present disclosure can solve problems occurring in the prior art while advantages achieved by the prior art are maintained intact.

An embodiment of the present disclosure provides a system and a method for controlling a vehicle capable of detecting a wake-up inducing controller and preventing a battery from being discharged.

Another embodiment of the present disclosure provides a system and a method for controlling a vehicle capable of determining a failure when a wake-up count exceeds a threshold value and informing a user of predicting a battery will be discharged when the failure is determined.

Another embodiment of the present disclosure provides a system and a method for controlling a vehicle capable of detecting a wake-up inducing controller from a vehicle having a history, in which a battery is discharged, to determine a controller which has induced remaining controllers to wake up.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a system for controlling a vehicle may include at least one controller to generate error information, based on the number of times of a transmission error detected when transmitting a first message after waking up, and store the error information at a time point at which the first message is successfully transmitted, a managing controller to receive the error information from the at least one controller, when the first message is successfully transmitted, and determine a first wake-up controller, based on the received error information, and a server to receive information about the first wake-up controller, from the managing controller, predict an operation of the vehicle based on the information about the first wake-up controller, and generate prediction information.

According to an embodiment, the server may receive the information about the first wake-up controller from the managing controller and count the number of times in which the first wake-up controller first wakes up.

According to an embodiment, the server may predict failure of the first wake-up controller and generate prediction information, when the number of times in which the first wake-up controller first wakes up exceeds a threshold value.

According to an embodiment, the server may predict a battery to be discharged and generate prediction information when the number of times in which the first wake-up controller first wakes up exceeds a threshold value.

According to an embodiment, the managing controller may receive the prediction information from the server.

According to an embodiment, the method may further include a vehicle control device to receive the prediction information from the managing controller and output the prediction information through an output device.

According to an embodiment, a first controller of the at least one controller may determine a transmission error of the first message as being detected, when the first controller of the at least one controller wakes up to transmit the first message to remaining controllers of the at least one controller and fails to receive a response signal to the first message from the remaining controllers.

According to an embodiment, the at least one controller may calculate a transmission error count (TEC) value by counting the number of times the transmission error is detected and determine a BUS-OFF state based on the TEC value.

According to an embodiment, the at least one controller may generate the error information including the TEC value and a history of the BUS-OFF state.

According to an embodiment, the managing controller may determine, as the first wake-up controller, a controller having at least one time in the number of times of detecting the transmission error.

According to another embodiment of the present disclosure, a method for controlling a vehicle may include generating, by at least one controller, error information, based on the number of times a transmission error is detected when transmitting a first message after waking up, and storing the error information at a time point at which the first message is successfully transmitted, receiving, by a managing controller, the error information from the at least one controller, when the first message is successfully transmitted, and determining a first wake-up controller based on the received error information, and receiving, by a server, information about the first wake-up controller, from the managing controller, predicting an operation of the vehicle based on the information about the first wake-up controller, and generating prediction information.

According to an embodiment, the method may further include receiving, by the server, the information about the first wake-up controller from the managing controller and counting the number of times in which the first wake-up controller first wakes up.

According to an embodiment, the method may further include predicting, by the server, failure of the first wake-up controller and generating prediction information when the number of times in which the first wake-up controller first wakes up exceeds a threshold value.

According to an embodiment, the method may further include predicting, by the server, a battery to be discharged and generating prediction information when the number of times in which the first wake-up controller first wakes up exceeds a threshold value.

According to an embodiment, the method may further include receiving, by the managing controller, the prediction information from the server.

According to an embodiment, the method may further include receiving, by a vehicle control device, the prediction information from the managing controller and outputting the prediction information through an output device.

According to an embodiment, the method may further include detecting, by the first controller, a transmission error of the first message when the first controller of the at least one controller wakes up to transmit the first message to remaining controllers of the at least one controller and fails to receive a response signal to the first message from the remaining controllers.

According to an embodiment, the method may further include calculating, by the at least one controller, a transmission error count (TEC) value by counting the number of times of detecting the transmission error, and determining a BUS-OFF state based on the TEC value.

According to an embodiment, the method may further include generating, by the at least one controller, the error information including the TEC value and a history of the BUS-OFF state.

According to an embodiment, the method may further include determining, by the managing controller, a controller having at least one time in the number of times of detecting the transmission error as the first wake-up controller.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
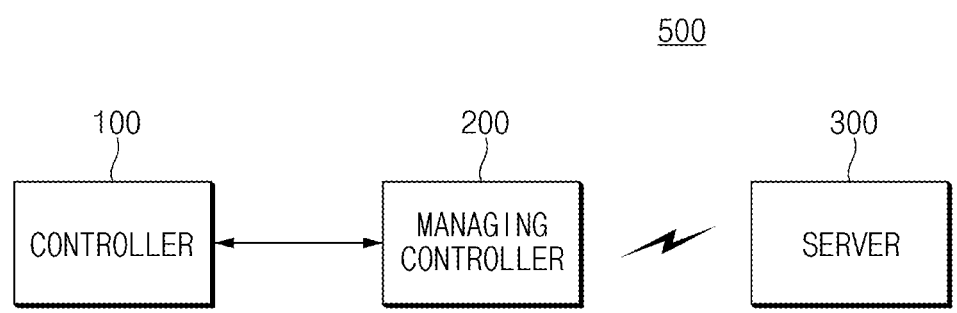
FIG. 1 is a view illustrating the configuration of a system for controlling a vehicle, according to an embodiment of the present disclosure.

Hereinafter, some embodiments of the present disclosure will be described in detail with reference to the accompanying drawings. In adding the reference numerals to the components of each drawing, it should be noted that the identical or equivalent component is designated by the identical numeral even when it is displayed on other drawings. In addition, in the following description of embodiments of the present disclosure, a detailed description of well-known features or functions will be omitted in order not to unnecessarily obscure the gist of the embodiments of the present disclosure.

In describing the components of the embodiments according to the present disclosure, terms such as first, second, "A", "B", "(a)", "(b)", and the like may be used. These terms are merely intended to distinguish one component from another component, and the terms do not limit the nature, sequence, or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application.

FIG. 1 is a view illustrating the configuration of a system for controlling a vehicle, according to an embodiment of the present disclosure.

As illustrated in FIG. 1, the system (hereinafter, the "vehicle control system") 500 for controlling the vehicle may include a controller 100, a managing controller 200, and a server 300.

The controller 100 may calculate the optimal control value by using an electrical signal, which is received from various types of sensors mounted in at least one vehicle, to control the operation of the vehicle based on the optimal control value calculated. The controller 100 may support a remote wake-up function. Accordingly, when any one controller enters a wake-up state, the controller in the wake-up state may allow remaining controllers, which are not in the wake-up state, to wake up. Controllers 100 may be connected to each other through a controller area network (CAN) bus. According to an embodiment, the controllers 100 may make CAN with flexible data rate (CANFD) communication.

The managing controller 200 may request from at least one controller 100 information for diagnosing the at least one controller 100 through a unified diagnostic service (UDS) protocol and may make communication with a server (cloud server) outside the vehicle to transmit information collected from the at least one controller 100.

The server 300 may receive and collect information received from the managing controller 200 and may analyze the operation of the at least one controller 100.

Figure 2:
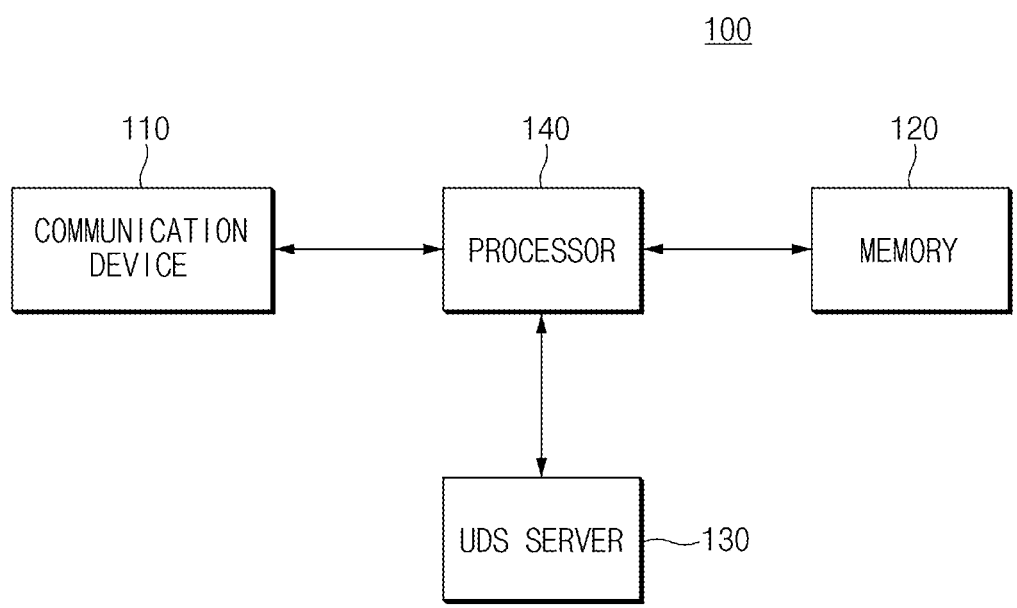
FIG. 2 is a view illustrating the configuration of a controller, according to an embodiment of the present disclosure.

FIG. 2 is a view illustrating the configuration of a controller, according to an embodiment of the present disclosure.

As illustrated in FIG. 2, the controller 100 may include a communication device 110, a memory 120, a UDS server 130, and a processor 140.

The communication device 110 may include a CAN driver and may make CANFD communication with different controllers.

The memory 120 may store at least one algorithm to compute or execute various instructions for the operation of the controller 100 according to an embodiment of the present disclosure.

The UDS server 130 may make diagnosis-communication with a UDS client 230 of the managing controller 200 through the UDS protocol. When receiving the request for transmitting information (error information) for diagnosing the controller 100 from the UDS client 230, the UDS server 130 may transmit the information for diagnosing the controller 100 to the managing controller 200.

The processor 140 may be implemented by various processing devices, such as a microprocessor embedded therein with a semiconductor chip to operate or execute various instructions, and may control the vehicle control apparatus according to an embodiment. The processor 140 may include at least one of a central processing unit, an application processor, a communication processor (CP), or a combination thereof.

Figure 3:
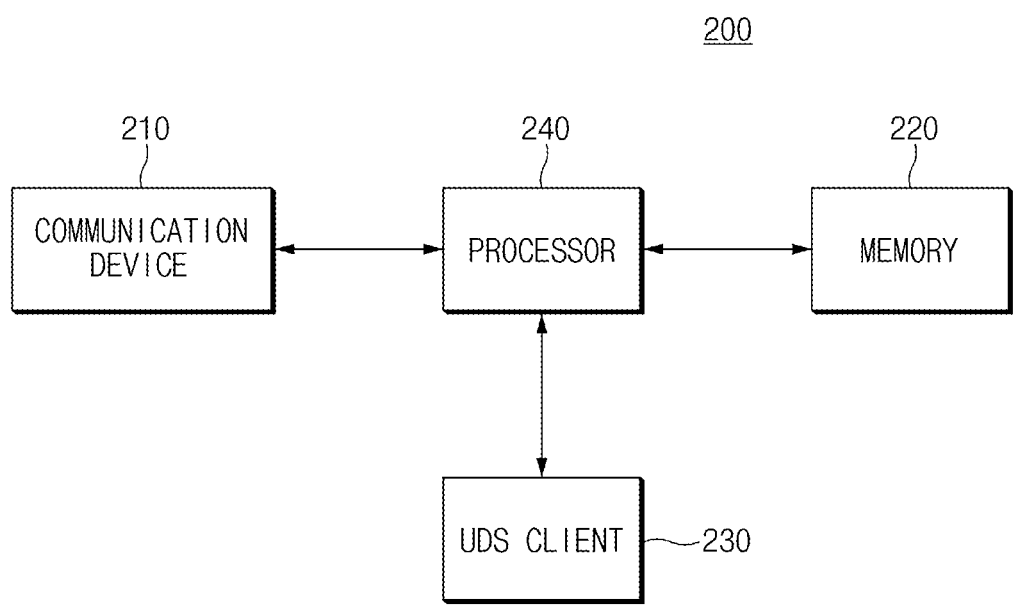
FIG. 3 is a view illustrating the configuration of a managing controller, according to an embodiment of the present disclosure.

FIG. 3 is a view illustrating the configuration of a managing controller, according to an embodiment of the present disclosure.

As illustrated in FIG. 3, the managing controller 200 may include a communication device 210, a memory 220, the UDS client 230, and a processor 240.

The communication device 210 may include a CAN driver and may make CANFD communication with the at least one controller 100. In addition, the communication device 210 may include a transceiver to transmit or receive information through an antenna, a communication circuit, or a communication processor, and it may make wireless communication with the server 300 through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), or Long Term Evolution (LTE).

The memory 220 may store at least one algorithm to compute or execute various instructions for the operation of the managing controller 200 according to an embodiment of the present disclosure.

The UDS client 230 may make diagnosis-communication with the UDS server 130 of the controller 100 through the UDS protocol, and it may request the UDS server 130 to transmit the information for diagnosing the controller 100. The UDS client 230 may transmit the information for diagnosing the controller 100 to the server 300 when receiving the information for diagnosing the controller 100.

The processor 240 may be implemented by various processing devices, such as a microprocessor embedded therein with a semiconductor chip to operate or execute various instructions, and it may control the overall operation of the managing controller according to an embodiment of the present disclosure. The processor 240 may include at least one of a central processing unit, an application processor, a communication processor (CP), or a combination thereof. The details of the overall operation of the controller 100 and the managing controller 200 will be described with reference to FIGS. 4 to 7.

FIGS. 4 to 7 are views schematically illustrating the operation of the vehicle control system according to an embodiment.

Figure 4:
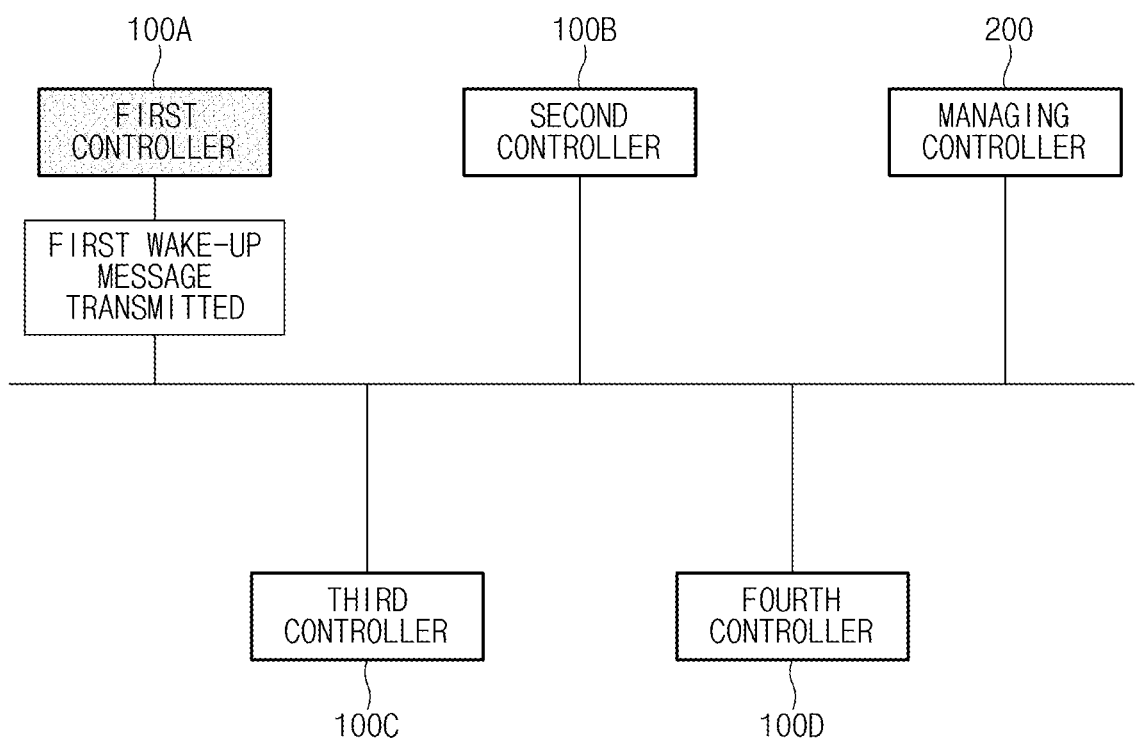
FIGS. 4 to 7 are views schematically illustrating the operation of a vehicle control system, according to an embodiment.

As illustrated in FIG. 4, when any one controller of at least one controller (e.g., a first controller 100A), a second controller 100B, a third controller 100C, and a fourth controller 100D) wakes up, the first controller 100A may transmit a first message to the remaining controllers (the second controller 100B, the third controller 100C, and the fourth controller 100D) and the managing controller 200 such that the remaining controllers (the second controller 100B, the third controller 100C, and the fourth controller 100D) and the managing controller 200 wake up.

Figure 5:
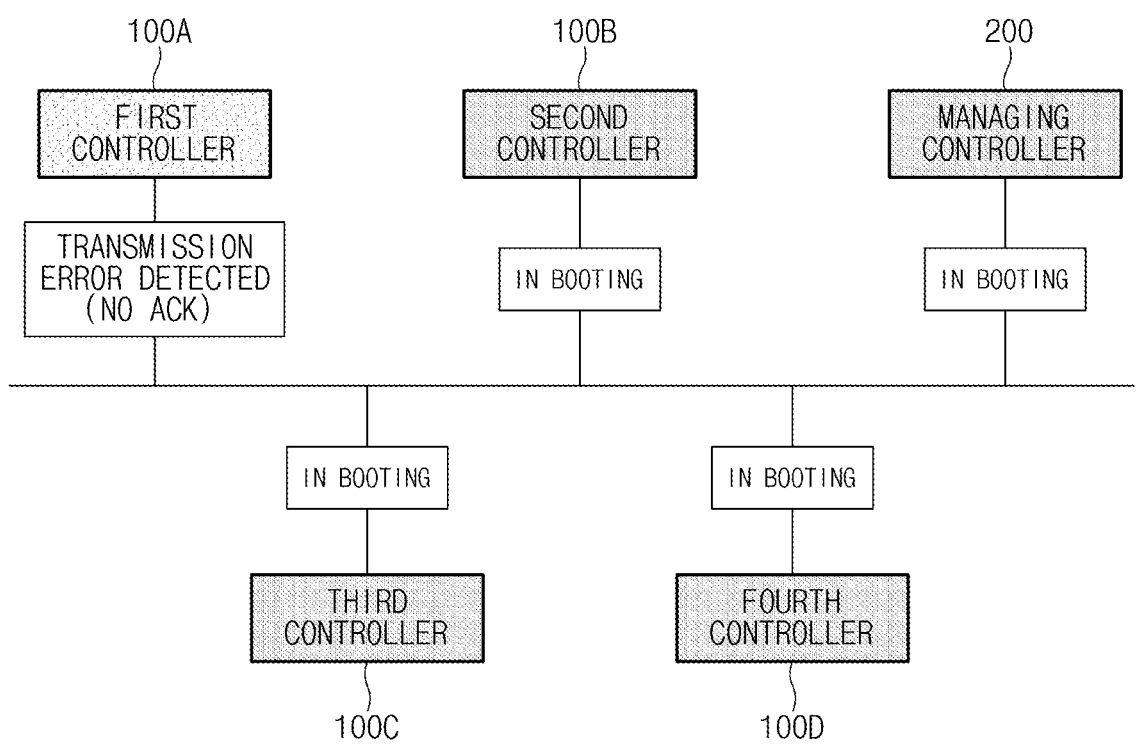

As illustrated in FIG. 5, the remaining controllers (the second controller 100B, the third controller 100C, and the fourth controller 100D) and the managing controller 200 may receive the first message from the first controller 100A to be shifted to be in a booting state.

The first controller 100A may determine whether a response (ACK signal) to the first message is received, after transmitting the first message. The response signal to the first message may be transmitted after the controller wakes up. Accordingly, the first controller 100A may fail to receive the response to the first message before the remaining controllers (the second controller 100B, the third controller 100C, and the fourth controller 100D) and the managing controller 200 wake up.

The first controller 100A may detect a transmission error as the response signal is not received, when failing to receive the response signal to the first message. The first controller 100A may generate error information based on the number of times a transmission error is detected. In this case, the error information may include a transmission error count (TEC) value and a history of BUS-OFF.

According to an embodiment, the first controller 100A may calculate the TEC value by counting the number of times of transmission errors. The TEC value is increased by '8' whenever the number of times of a transmission error is increased by one time, as the first controller 100A fails to receive the response signal after the first message is transmitted. For example, when the number of times of a transmission error is '0', the TEC value may be calculated as '0', and when the number of times of a transmission error is '1', the TEC value may be calculated as '8'.

The first controller 100A may determine a BUS-OFF state based on the TEC value. According to an embodiment, the first controller 100A may determine whether the TEC value calculated by counting the number of times of the transmission error exceeds '255'. The first controller 100A may determine the BUS-OFF state as coming, when determining the number of times of the transmission error as exceeding '255', based on the TEC value. The first controller 100A may store the history of BUS-OFF and reset (initialize) the TEC value.

Figure 6:
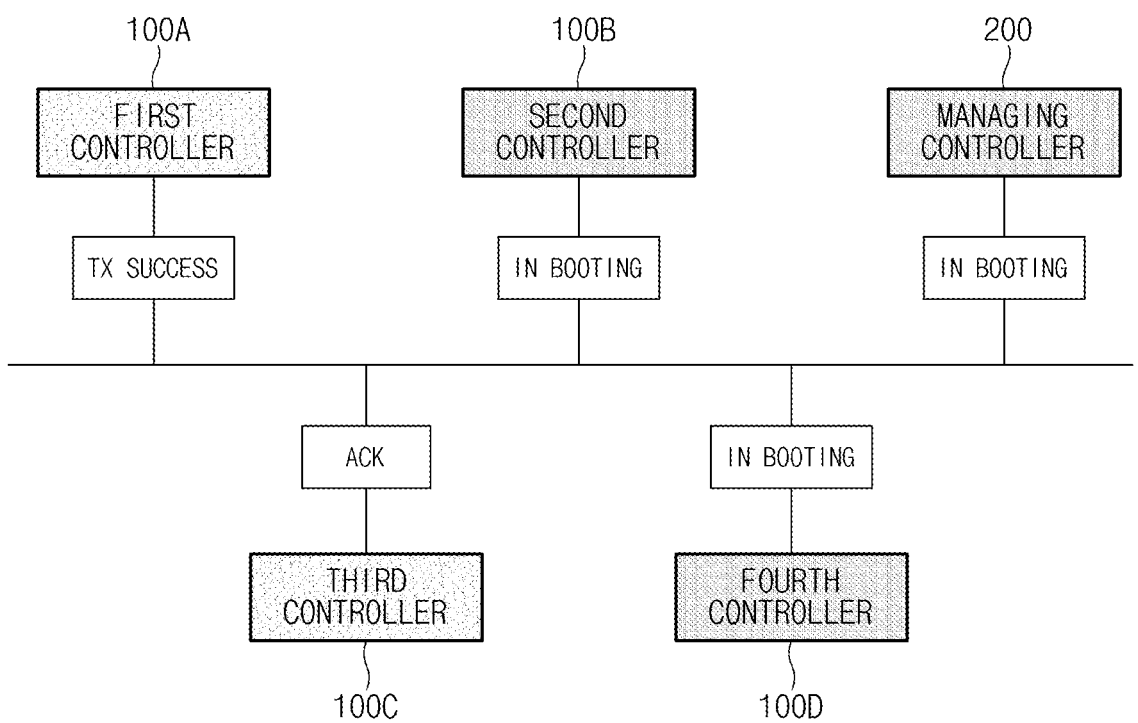

As illustrated in FIG. 6, the third controller 100C may transmit the response signal to the first message, which is received from the first controller 100A, to the first controller 100A, when any one controller of the remaining controllers (the second controller 100B, the third controller 100C, and the fourth controller 100D) and the managing controller 200 in the booting state wakes up.

The first controller 100A may determine the first message as being successfully transmitted, when receiving the response signal from the third controller 100C, and may store error information at a time point when the first message is successfully transmitted.

Figure 7:
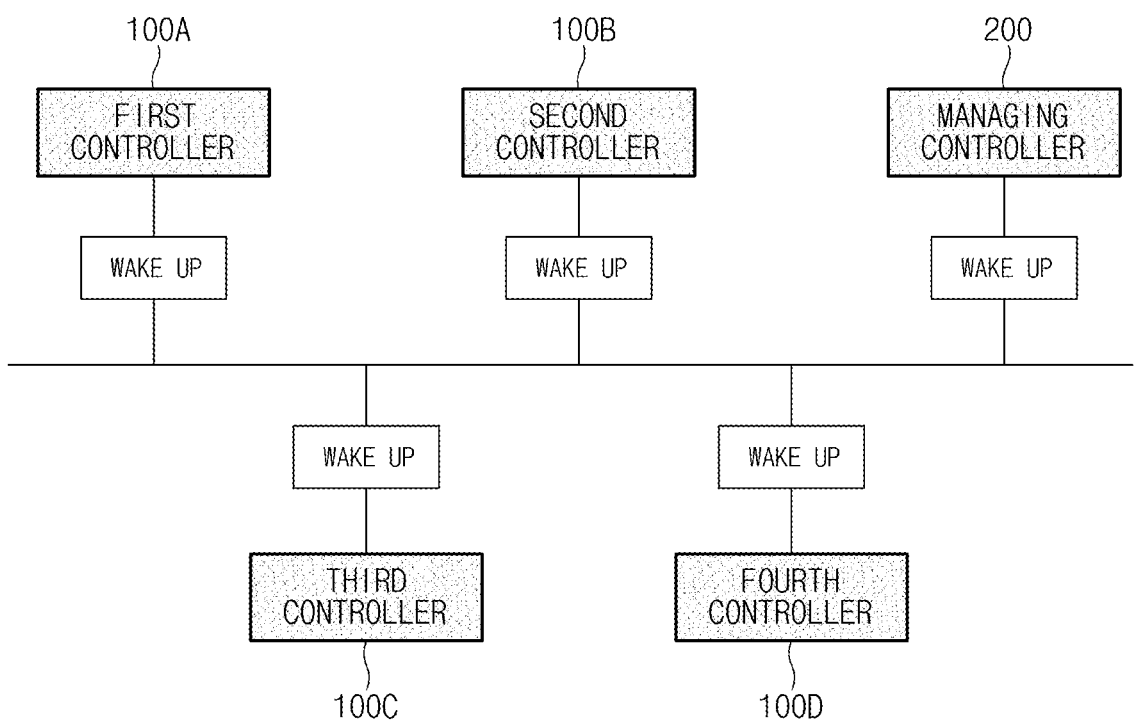

As illustrated in FIG. 7, when the remaining controllers (the second controller 100B, the third controller 100C, and the fourth controller 100D) and the managing controller 200 wake up, the remaining controllers (the second controller 100B, the third controller 100C, and the fourth controller 100D) and the managing controller 200 may transmit the first message to another controller. For example, the second controller 100B may transmit the first message to the first controller 100A, the third controller 100C, the fourth controller 100D, and the managing controller 200, and the third controller 100C, the fourth controller 100D, and the managing controller 200 may transmit the first message in the same manner as the second controller 100B.

The first controller 100A is in the wake-up state, at the time point when the remaining controllers (the second controller 100B, the third controller 100C, and the fourth controller 100D) and the managing controller 200 wake up. Accordingly, the remaining controllers (the second controller 100B, the third controller 100C, and the fourth controller 100D) and the managing controller 200 may receive a response signal from the first controller 100A after transmitting the first message, and they may determine the first message as being successfully transmitted. The remaining controllers (the second controller 100B, the third controller 100C, and the fourth controller 100D) may store error information at a time point when the first message is successfully transmitted.

The managing controller 200 may transmit a request for the error information at a time point when the first message is successfully transmitted, to the remaining controllers (the second controller 100B, the third controller 100C, and the fourth controller 100D) after successfully transmitting the first message. In this case, the error information may include a transmission error count (TEC) value and a history of BUS-OFF.

The managing controller 200 may determine whether a controller having an error detection history stored therein is present, based on received error information, when the error information is received from the remaining controllers. For example, the managing controller 200 may determine the error detection history as not being stored, as the error is not detected when the TEC value is '0', and may determine the error detection history as being stored, as the error is detected when the TEC value exceeds '8'.

According to an embodiment, the managing controller 200 may determine the error detection history as being stored based on error information received from the first controller 100A and may determine the error detection history as not being stored, based on the error information received from the second controller 100B, the third controller 100C, and the fourth controller 100D.

The managing controller 200 may determine a controller having the error detection history stored therein as a wake-up inducing controller.

The managing controller 200 may transmit, to the server 300, information about the wake-up inducing controller and the error information of the remaining controllers, when the wake-up inducing controller is determined.

The managing controller 200 may transmit prediction information to a vehicle control device 400, when receiving the prediction information from the server 300.

Figure 8:
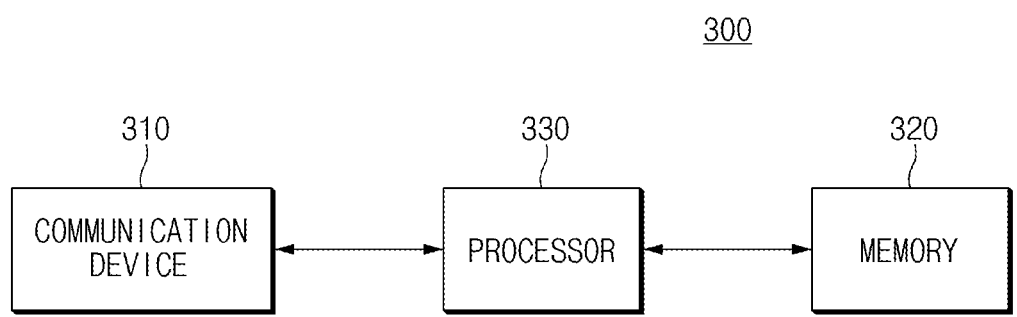
FIG. 8 is a view illustrating the configuration of a server, according to an embodiment of the present disclosure.

FIG. 8 is a view illustrating the configuration of a server, according to an embodiment of the present disclosure.

As illustrated in FIG. 8, the server 300 may include a communication device 310, a memory 320, and a processor 330.

The communication device 310 may include a transceiver to transmit or receive information through an antenna, a communication circuit, or a communication processor, and it may make wireless communication with the managing controller 200 through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), or Long Term Evolution (LTE).

The memory 320 may store at least one algorithm to compute or execute various instructions for the operation of the server 300 according to an embodiment of the present disclosure.

The processor 330 may be implemented by various processing devices, such as a microprocessor embedded therein with a semiconductor chip to operate or execute various instructions, and it may control the overall operation of the server according to an embodiment. The processor 330 may include at least one of a central processing unit, an application processor, a communication processor (CP), or a combination thereof.

The processor 320 may receive information about the wake-up inducing controller and the error information of the remaining controllers from the managing controller 200, and it may collect a time point when the first wake-up controller wakes up, a CAN channel, and information about controllers being in the wake-up state by the first wake-up controller.

The processor 330 may determine whether the first wake-up controller first wakes up sustainably. According to an embodiment, the processor 330 may count the number of times in which the first wake-up controller first wakes up, based on the time point when the first wake-up controller wakes up, and the information (information about the time point when the controllers enter the wake-up state) about the controllers entering the wake-up state by the first wake-up controller. In addition, the processor 330 may determine whether the number of times in which the first wake-up controller first wakes up exceeds a threshold value.

The processor 330 may predict the operation of the vehicle and generate prediction information when the number of times in which the first wake-up controller first wakes up exceeds the threshold value. According to an embodiment, the processor 330 may predict the failure of the first wake-up controller and generate the prediction information when the number of times in which the first wake-up controller first wakes up exceeds the threshold value. According to an embodiment, the processor 330 may predict the battery of the vehicle as being discharged and generate the prediction information when the number of times in which the first wake-up controller first wakes up exceeds the threshold value.

The processor 330 may transmit the prediction information to the managing controller 200 when the prediction information is generated.

Figure 9:
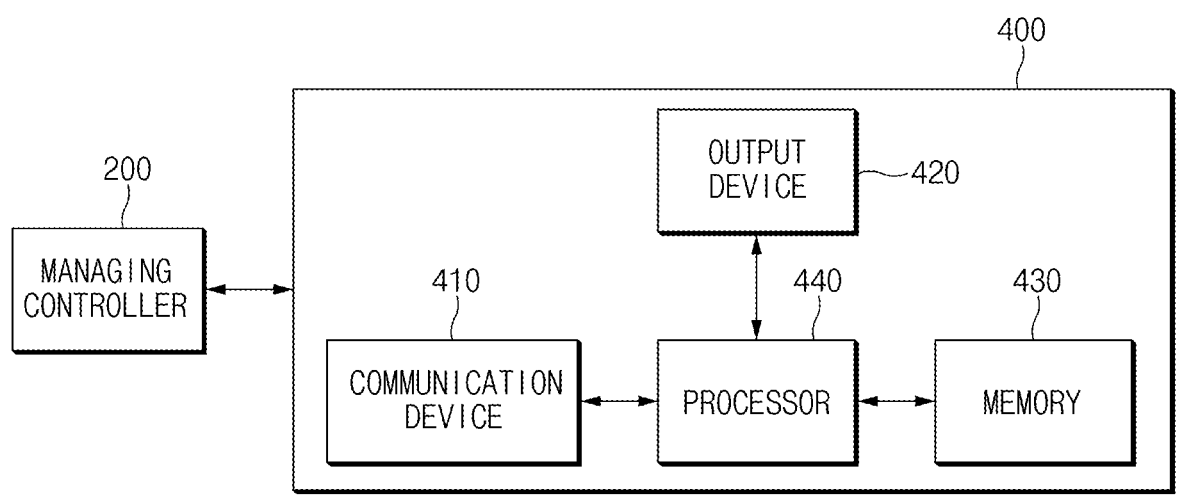
FIG. 9 is a view illustrating the configuration of a vehicle control device making communication with a managing controller, according to an embodiment of the present disclosure.

FIG. 9 is a view illustrating the configuration of a vehicle control device making communication with the managing controller, according to an embodiment of the present disclosure.

As illustrated in FIG. 9, the vehicle control device 400 may include a communication device 410, an output device 420, a memory 430, and a processor 440.

The communication device 410 may include a transceiver to transmit or receive information through an antenna, a communication circuit, or a communication processor, and it may make wireless communication with the managing controller 200 through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), or Long Term Evolution (LTE).

The output device 420 may output an image or a sound under the control of the processor 440. According to an embodiment, the output device 420 may be realized using a display device or a sound output device. In this case, the display device may include a head up display (HUD) or cluster. According to an embodiment, the display device may be realized with a display that employs a liquid crystal display (LCD) panel, a light emitting diode (LED) panel, an organic light emitting diode (OLED) panel, or a plasma display panel (PDP). The LCD may include a thin film transistor-LCD (TFT-LCD). The display device may be integrally realized through a touch screen panel (TSP)

The memory 430 may store at least one algorithm to compute or execute various instructions for the operation of the vehicle control device according to an embodiment of the present disclosure. According to an embodiment, the memory 430 may store at least one instruction executed by the processor 440, and the instruction may allow the vehicle control apparatus to operate according to an embodiment. The memory 430 may be implemented with at least one of storage media of a flash memory, a hard disk, a memory card, a read-only memory (ROM), a random access memory (RAM), an electrically erasable and programmable memory (EEPROM), a magnetic memory, a magnetic disk, or an optical disk.

The processor 440 may be implemented by various processing devices, such as a microprocessor embedded therein with a semiconductor chip to operate or execute various instructions, and it may control the overall operation of the server according to an embodiment. The processor 440 may include at least one of a central processing unit, an application processor, a communication processor (CP), or a combination thereof.

When receiving the prediction information transmitted from the managing controller 200, the processor 440 may output the prediction information to the output device 420. Accordingly, the processor 440 may provide, for a user, information for improving the function of the vehicle by allowing the user to intuitively perceive the prediction information generated by the server.

Figure 10:
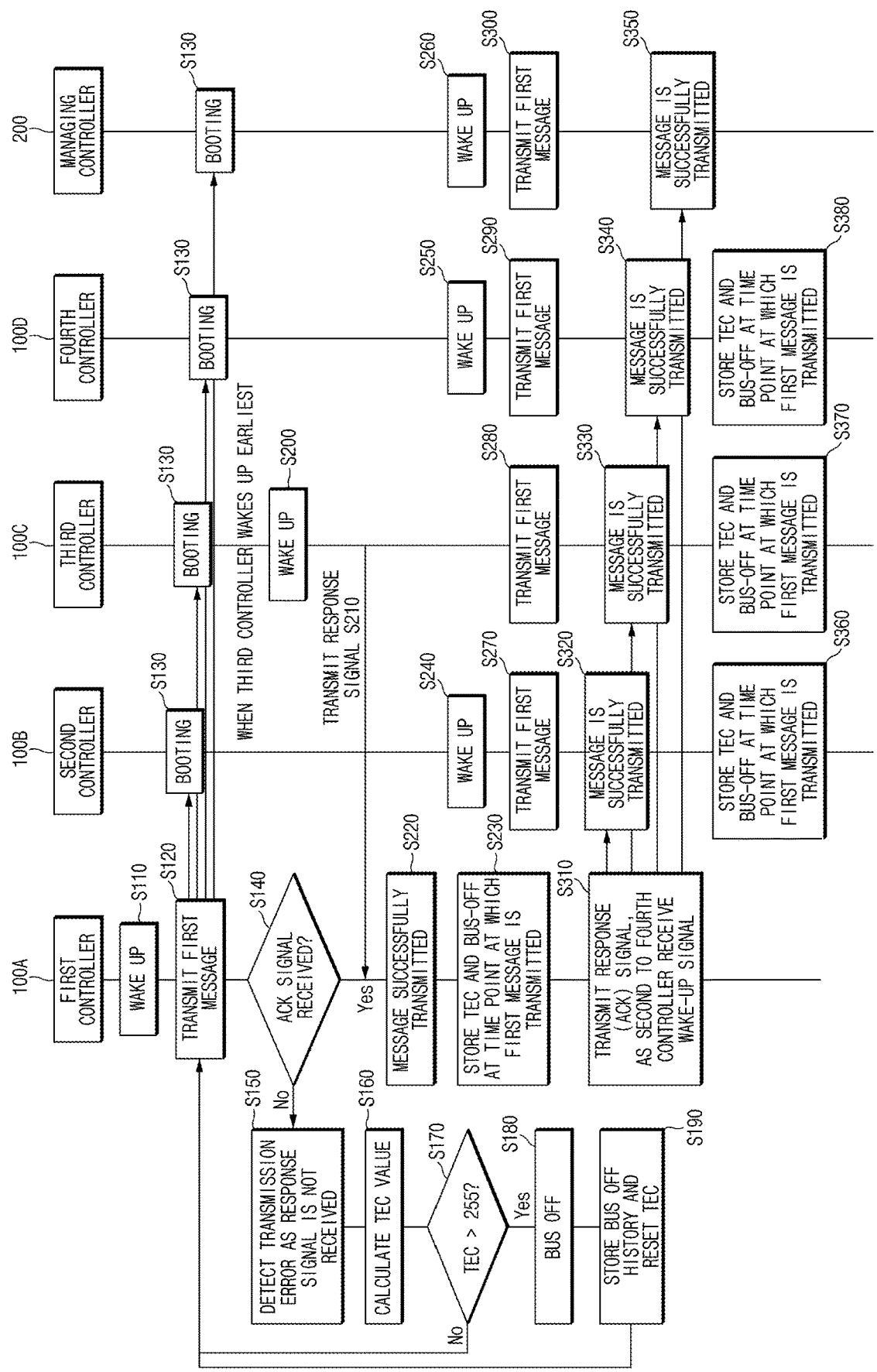
FIGS. 10 to 12 are flowcharts illustrating a method for controlling a vehicle, according to an embodiment of the present disclosure.
Figure 11:
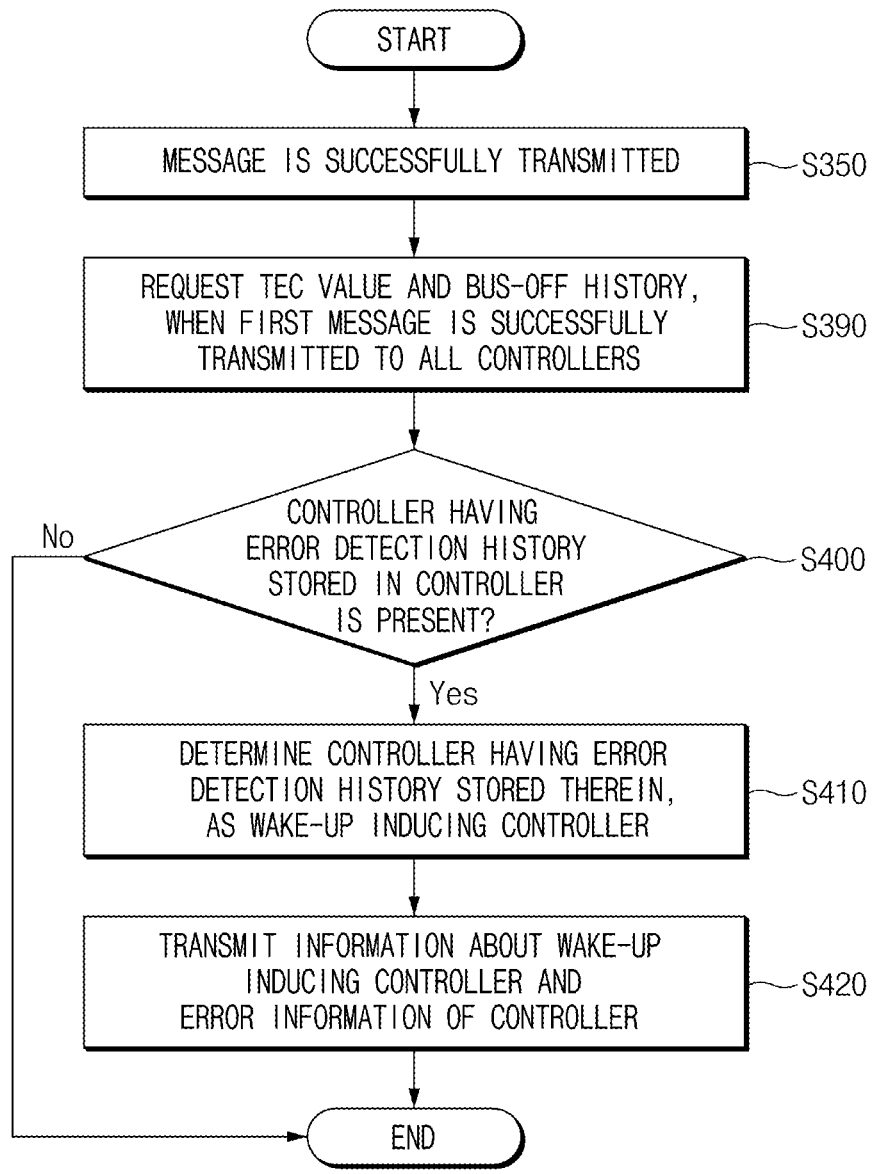
Figure 12:
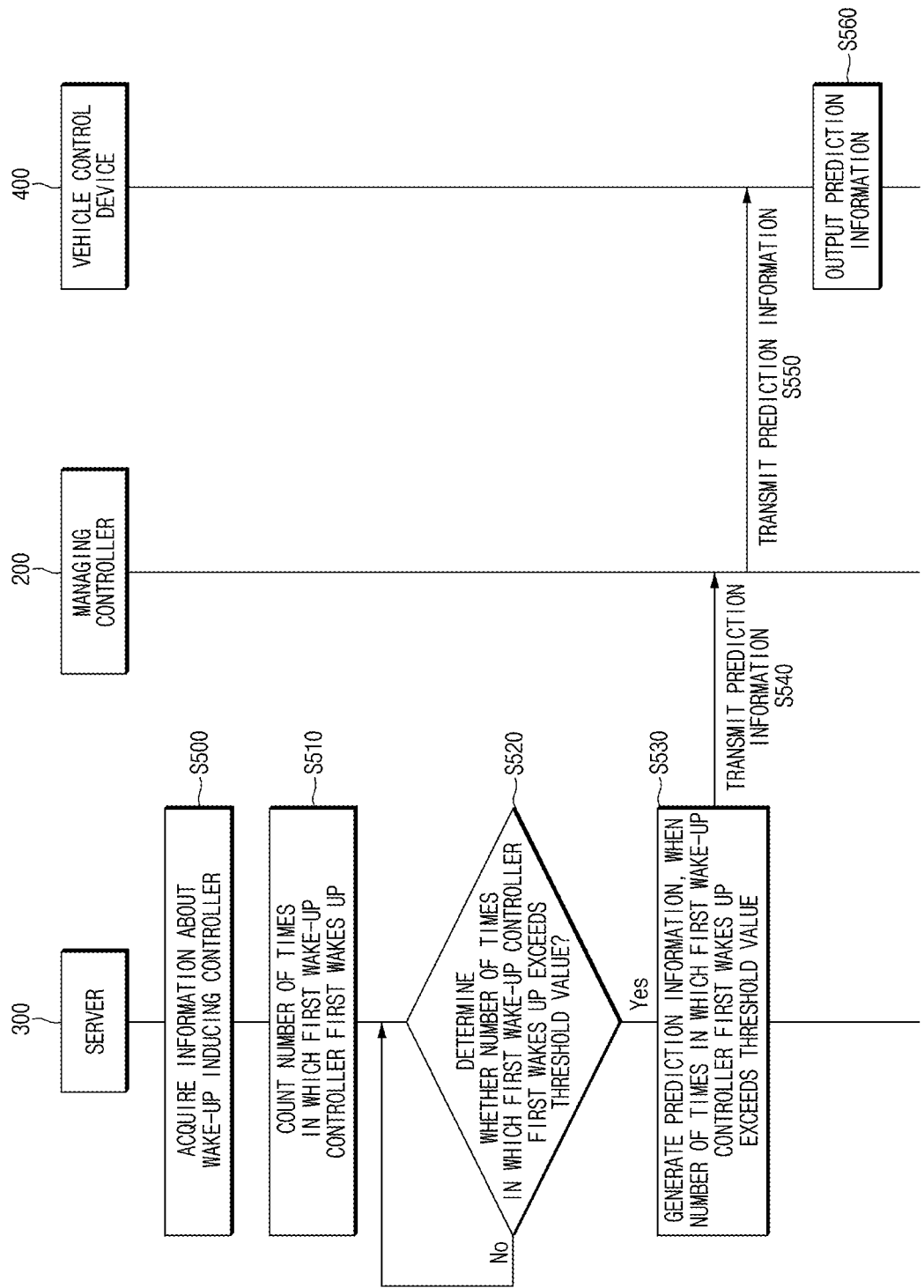

FIGS. 10 to 12 are flowcharts illustrating a method for controlling a vehicle, according to an embodiment of the present disclosure.

As illustrated in FIG. 10, any one controller (e.g., the first controller 100A) of at least one controller (e.g., the first controller 100A, the second controller 100B, the third controller 100C, and the fourth controller 100D) may wake up (S110).

The first controller 100A may transmit the first message to the remaining controllers (the second controller 100B, the third controller 100C, and the fourth controller 100D) and the managing controller 200 to allow the remaining controllers (the second controller 100B, the third controller 100C, and the fourth controller 100D) and the managing controller 200 to wake up (S120).

The remaining controllers (the second controller 100B, the third controller 100C, and the fourth controller 100D) and the managing controller 200 may receive the first message from the first controller 100A to be shifted to be in a booting state (S130).

The first controller 100A may determine whether a response (ACK signal) to the first message is received, after transmitting the first message (S140). The response signal to the first message may be transmitted after the controllers wake up. Accordingly, the first controller 100A may fail to receive the response to the first message before the remaining controllers (the second controller 100B, the third controller 100C, and the fourth controller 100D) wake up.

The first controller 100A may detect a transmission error as the response signal is not received, when failing to receive the response signal to the first message (S150).

The first controller 100A may generate error information based on the number of times a transmission error is detected when the first message is transmitted. In this case, the error information may include a transmission error count (TEC) value and a BUS-OFF history.

According to an embodiment, the first controller 100A may calculate the TEC value by counting the number of times of the transmission error. The TEC value is increased by '8' whenever the number of times of the transmission error is increased by one time, as the first controller 100A fails to receive the response signal after the first message is transmitted. For example, when the number of transmission errors is '0', the TEC value may be calculated as '0', and when the number of transmission errors is '1', the TEC value may be calculated as '8'.

The first controller 100A may determine a BUS-OFF state based on the TEC value. According to an embodiment, the first controller 100A may determine whether the TEC value calculated by counting the number of times of the transmission error exceeds '255' (S170).

The first controller 100A may determine the BUS-OFF state as coming, when determining the number of times of the transmission error as exceeding '255', based on the TEC value. The first controller 100A may store a BUS-OFF history and reset (initialize) the TEC value (S190).

Any one controller (e.g., the third controller 100C) of the remaining controllers (the second controller 100B, the third controller 100C, and the fourth controller 100D) and the managing controller 200 in the booting state may wake up (S200).

The third controller 100C may transmit the response signal to the first message, which is received from the first controller 100A, to the first controller 100A (S210).

The first controller 100A may determine the first message as being successfully transmitted, when receiving the response signal from the third controller 100C (S220). The first controller 100A may store error information at a time point when the first message is successfully transmitted (S230).

When all the remaining controllers (the second controller 100B, the third controller 100C, and the fourth controller 100D) and the managing controller 200 wake up (S240, S250, and S260), the remaining controllers (the second controller 100B, the third controller 100C, and the fourth controller 100D) and the managing controller 200 may transmit the first message to another controller (S270, S280, S290, and S300).

For example, the second controller 100B may transmit the first message to the first controller 100A, the third controller 100C, the fourth controller 100D, and the managing controller 200 in S270, and the third controller 100C, the fourth controller 100D, and the managing controller 200 may transmit the first message to another controller in the same manner as the second controller 100B.

The first controller 100A is in the wake-up state at the time point when the remaining controllers (the second controller 100B, the third controller 100C, and the fourth controller 100D) and the managing controller 200 wake up. Accordingly, the first controller 100A may transmit the response signal to the first message received therein, when receiving the first message from the remaining controllers (the second controller 100B, the third controller 100C, and the fourth controller 100D) and the managing controller 200.

The remaining controllers (the second controller 100B, the third controller 100C, and the fourth controller 100D) and the managing controller 200 may receive the response signal from the first controller 100A after transmitting the first message and may determine the first messages as being successfully transmitted (S320, S330, S340, and S350).

The remaining controllers (the second controller 100B, the third controller 100C, and the fourth controller 100D) may store error information at a time point when the first message is successfully transmitted (S360, S370, and S380).

As illustrated in FIG. 11, the managing controller 200 may transmit a request for the error information stored at a time point when the first message is successfully transmitted to the remaining controllers (the second controller 100B, the third controller 100C, and the fourth controller 100D) (S390), after successfully transmitting the first message (S350). In this case, the error information may include a transmission error count (TEC) value and a BUS-OFF history.

The managing controller 200 may determine whether a controller having an error detection history stored therein is present, based on received error information, when the error information is received from the controller (S400). For example, the managing controller 200 may determine the error detection history as not being stored, as the error is not detected when the TEC value is '0', and it may determine the error detection history as being stored, as the error is detected when the TEC value exceeds '8'.

According to an embodiment, in S400, the managing controller 200 may determine the error detection history as being stored based on error information received from the first controller 100A, and it may determine the error detection history as not being stored, based on the error information received from the second controller 100B, the third controller 100C, and the fourth controller 100D.

The managing controller 200 may determine a controller having the error detection history stored therein as a wake-up inducing controller (S410).

The managing controller 200 may transmit, to the server 300, information about the wake-up inducing controller and the error information of the remaining controllers, when the wake-up inducing controller is determined (S420).

As illustrated in FIG. 12, the server 300 may acquire the information about the wake-up inducing controller and the error information of the remaining controllers from the managing controller 200 (S500).

In S500, the server 300 may collect a time when the first wake-up controller first wakes up, a CAN channel, and information about controllers being in the wake-up state by the first wake-up controller, based on information received from the managing controller 200.

The server 300 may determine whether the first wake-up controller first wakes up sustainably. According to an embodiment, the server 300 may count the number of times in which the first wake-up controller first wakes up, based on the time point when the first wake-up controller wakes up, and the information about controllers entering the wake-up state by the first wake-up controller (S510), and it may determine whether the number of times in which the first wake-up controller first wakes up exceeds the threshold value (S520).

The server 300 may predict the operation of the vehicle and generate prediction information when the number of times in which the first wake-up controller first wakes up exceeds the threshold value (S530).

According to an embodiment, in S530, the server 300 may predict the failure of the first wake-up controller and generate the prediction information when the number of times in which the first wake-up controller first wakes up exceeds the threshold value. According to an embodiment, the server 300 may predict the battery of the vehicle as being discharged and generate the prediction information when the number of times in which the first wake-up controller first wakes up exceeds the threshold value. In addition, the server 300 may transmit the prediction information to the managing controller 200 (S540).

The managing controller 200 may transmit prediction information to the vehicle control device 400 when receiving the prediction information from the server 300 (S550).

When receiving the prediction information transmitted from the managing controller 200, the vehicle control device 400 may output the prediction information to the output device 420 (S560). Accordingly, the vehicle control device 400 may provide, for a user, information for improving the function of the vehicle by allowing the user to intuitively perceive the prediction information generated by the server.

Figure 13:
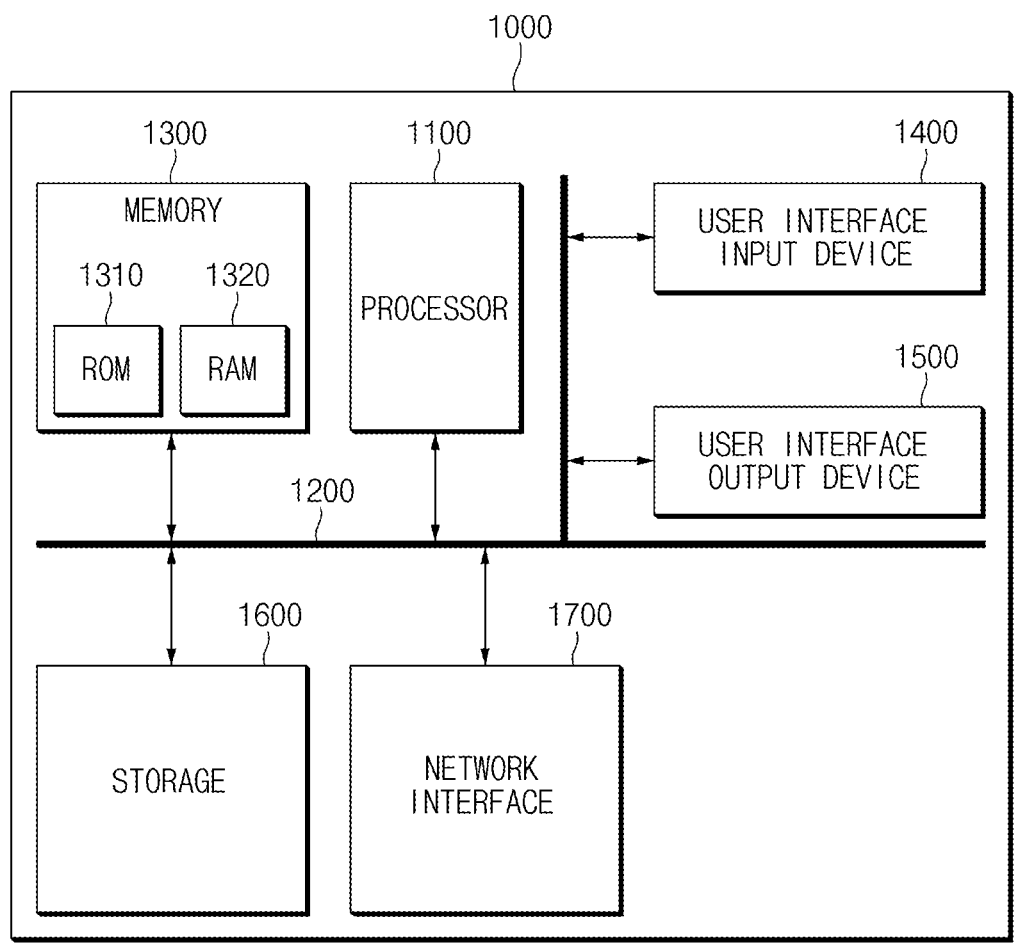
FIG. 13 is a view illustrating the configuration of a computing system to execute a method, according to an embodiment of the present disclosure.

FIG. 13 is a view illustrating the configuration of a computing system to execute a method according to an embodiment of the present disclosure.

Referring to FIG. 13, a computing system 1000 may include at least one processor 1100, a memory 1300, a user interface input device 1400, a user interface output device 1500, a storage (i.e., a memory) 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a ROM 1310 and a RAM 1320.

Thus, the operations of the methods or algorithms described in connection with the embodiments disclosed in the present disclosure may be directly implemented with a hardware module, a software module, or a combination thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the system and the method for controlling the vehicle, the battery may be prevented from being discharged by detecting the wake-up inducing controller.

According to an embodiment of the present disclosure, in the system and the method for controlling the vehicle, when the wake-up count exceeds the threshold value, the failure may be determined. When the failure is determined, the user may be informed of predicting a discharged battery.

According to an embodiment of the present disclosure, in the system and the method for controlling the vehicle, the wake-up inducing controller may be detected from the vehicle having the history in which the battery is discharged to determine a controller which has induced remaining controllers to wake up.

Hereinabove, although embodiments of the present disclosure have been described with reference to exemplary embodiments and the accompanying drawings, the embodiments of the present disclosure are not limited thereto, but they may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A system for controlling a vehicle, the system comprising:
   at least one controller configured to generate error information based on a number of times a transmission error is detected after transmitting a first message after waking up and store the error information at a time point at which the first message is successfully transmitted;
   a managing controller configured to receive the error information from the at least one controller, in response to the first message being successfully transmitted, and determine a first wake-up controller based on the received error information;
   a server configured to receive information about the first wake-up controller from the managing controller, count a number of times that the first wake-up controller first wakes up, predict an operation of the vehicle based on the information about the first wake-up controller, and generate prediction information, wherein, in a case in which the number of times that the first wake-up controller first wakes up exceeds a threshold value, the server is further configured to predict a battery to be discharged.

2. The system of claim 1, wherein, in a case in which the number of times that the first wake-up controller first wakes up exceeds a threshold value, the server is configured to predict a failure of the first wake-up controller and generate the prediction information.

3. The system of claim 1, wherein the managing controller is configured to receive the prediction information from the server.

4. The system of claim 1, further comprising a vehicle control device configured to receive the prediction information from the managing controller and output the prediction information through an output device.

5. The system of claim 1, wherein:
   the at least one controller comprises a first controller and remaining controllers; and
   the first controller is configured to determine the transmission error of the first message as being detected based on the first controller waking up to transmit the first message to the remaining controllers and failing to receive a response signal to the first message from the remaining controllers.

6. The system of claim 1, wherein the at least one controller is configured to calculate a transmission error count (TEC) value by counting the number of times the transmission error is detected and determine a BUS-OFF state based on the TEC value.

7. The system of claim 6, wherein the at least one controller is configured to generate the error information including the TEC value and a history of the BUS-OFF state.

8. The system of claim 1, wherein the managing controller is configured to determine, as the first wake-up controller, a controller having at least one time in the number of times the transmission error is detected.

9. A method for controlling a vehicle, the method comprising: generating, by at least one controller, error information based on a number of times a transmission error is detected in response to transmitting a first message after waking up and storing the error information at a time point at which the first message is successfully transmitted;
   receiving, by a managing controller, the error information from the at least one controller, in response to the first message being successfully transmitted, and determining a first wake-up controller based on the received error information;
   receiving, by a server, information about the first wake-up controller from the managing controller that comprises a number of times in which the first wake-up controller first wakes up, predicting an operation of the vehicle based on the information about the first wake-up controller, predicting a battery to be discharged in response to the number of times that the first wake-up controller first wakes up exceeds a threshold value, and generating prediction information.

10. The method of claim 9, further comprising, in a case in which the number of times that the first wake-up controller first wakes up exceeds a threshold value, predicting, by the server, a failure of the first wake-up controller and generating the prediction information.

11. The method of claim 9, further comprising receiving, by the managing controller, the prediction information from the server.

12. The method of claim 9, further comprising:
   receiving, by a vehicle control device, the prediction information from the managing controller; and
   outputting, by the vehicle control device, the prediction information through an output device.

13. The method of claim 9, wherein the at least one controller comprises a first controller and remaining controllers, and wherein the method further comprises:
   detecting, by the first controller, the transmission error of the first message, in response to the first controller waking up to transmit the first message to the remaining controllers and failing to receive a response signal to the first message from the remaining controllers.

14. The method of claim 9, further comprising:
calculating, by the at least one controller, a transmission error count (TEC) value by counting the number of times the transmission error is detected; and
determining a BUS-OFF state based on the TEC value.

15. The method of claim 14, further comprising generating, by the at least one controller, the error information including the TEC value and a history of the BUS-OFF state.

16. The method of claim 9, further comprising determining, by the managing controller, a controller of the at least one controller having at least one time in the number of times the transmission error is detected as the first wake-up controller.

* * * * *